United States Patent [19]

Komatsu

[11] 4,235,072

[45] Nov. 25, 1980

[54] MOTOR DRIVE CIRCUIT IN DIGITAL TYPE ELECTRONIC TIME PIECE

[75] Inventor: Yasuo Komatsu, Suwa, Japan

[73] Assignee: Iida Sankyo Co., Ltd., Iida, Japan

[21] Appl. No.: 919,582

[22] Filed: Jun. 27, 1978

[30] Foreign Application Priority Data

Jun. 27, 1977 [JP] Japan ............................ 52/83542[U]

[51] Int. Cl.[3] ......................... G04C 3/00; G05B 19/40

[52] U.S. Cl. ..................................... 368/218; 318/696

[58] Field of Search ............... 58/23 D; 318/696, 379, 318/380

[56] References Cited

U.S. PATENT DOCUMENTS

| | | | |
|---|---|---|---|
| 3,466,520 | 9/1969 | Aylikci et al. | 318/138 |
| 3,919,611 | 11/1975 | Takahashi et al. | 318/380 |
| 3,971,204 | 7/1976 | Kawaguchi et al. | 58/23 D |
| 4,129,816 | 12/1978 | Feldy et al. | 318/696 |

*Primary Examiner*—J. V. Truhe
*Assistant Examiner*—John B. Conklin
*Attorney, Agent, or Firm*—Sughrue, Rothwell, Mion, Zinn and Macpeak

[57] ABSTRACT

The electric motor in a digital time piece is driven in accordance with a pulse width modulated signal by supplying the signal first to a logic circuit together with the output signal from a switch which is periodically opened and closed as the motor rotates. Application of a pulse to the logic circuit begins motor rotation which does not stop until the switch is tripped.

4 Claims, 6 Drawing Figures

MOTOR DRIVE CIRCUIT IN DIGITAL TYPE ELECTRONIC TIME PIECE

BACKGROUND OF THE INVENTION

This invention relates to digital type electronic time pieces, and more particularly to a motor drive circuit in such a digital type electronic time piece which drives a time indicating means with an electric motor in response to an input pulse signal.

One example of a conventional drive device in a digital type electronic time piece will be described with reference to FIG. 1.

A signal having a predetermined frequency outputted by a time reference source 1 utilizing a crystal oscillator, a commercial AC source, etc. is frequency-divided to 1/60 Hz, for instance, by a frequency division circuit 2, and is formed into a signal having a predetermined pulse width by a pulse width forming circuit 3. The output pulse signal of the pulse width forming circuit 3 is applied to a motor drive circuit 4 to drive an electric motor M. The motor M is a DC motor adapted to drive a time indicating means 5.

The pulse width of the pulse outputted by the pulse width forming circuit 3 is short, for instance several tens of milli-seconds to several hundreds of milli-seconds. Accordingly, in order to rotate the time indicating means a predetermined distance with this signal, it is necessary to provide a hold circuit in the motor drive circuit 4, which operates to hold the drive operation of the motor until the time indicating means 5 is rotated to cover the predetermined distance. Such a hold circuit has been disclosed by the applicant's Japanese Utility Model Application No. 32151/1975 (Japanese Utility Model Application Laid-Open No. 113464/1976). In this conventional hold circuit, the operation of a thyristor which is switched by the pulse from the pulse width forming circuit 3 or the like and the operation of a switch which is operated in association with the drive motor M of the time indicating means 5 are suitably combined to hold the drive of the motor. However, since the operation of the thyristor depends on temperature, erroneous operation may be caused in the hold circuit when ambient temperature changes occur. The conventional hold circuit is further disadvantageous in that setting the circuit constants in one attempt to eliminate this drawback is rather difficult. Furthermore, as holding current for holding the thyristor is necessary, the current consumption of the circuit is larger.

Another type of holding circuit is disclosed in U.S. Pat. No. 3,971,204. In that circuit, the drive signal is applied to the motor upon the occurrence of a pulse and the holding circuit is self-biased into a holding state until turned off by a stop signal supplied from a switch operated in conjunction with a predetermined degree of motor rotation. However, this circuit is still disadvantageous in that power consumption is high due to the self-biasing current which must be supplied.

SUMMARY OF THE INVENTION

Accordingly, an object of the invention is to provide a motor drive circuit for a digital type electronic time piece in which all of the above-described difficulties are eliminated and the current consumption is small.

Briefly, this is accomplished by providing the pulse width modulated signal to a logic circuit to which is also supplied the output from a switch operated in conjunction with motor rotation. The pulse signal is used as a set signal and the switch signal as a reset signal and the output of the flip-flop logic circuit is supplied through a buffer to drive a motor drive transistor. The flip-flop output is also supplied through an invertor to a transistor connected to absorb the counter emf in the motor when the drive transistor is cut off.

BRIEF DESCRIPTION OF THE DRAWINGS

This invention will now be described with reference to the accompanying drawings, in which.

DETAILED DESCRIPTION OF THE INVENTION

Figure 1:
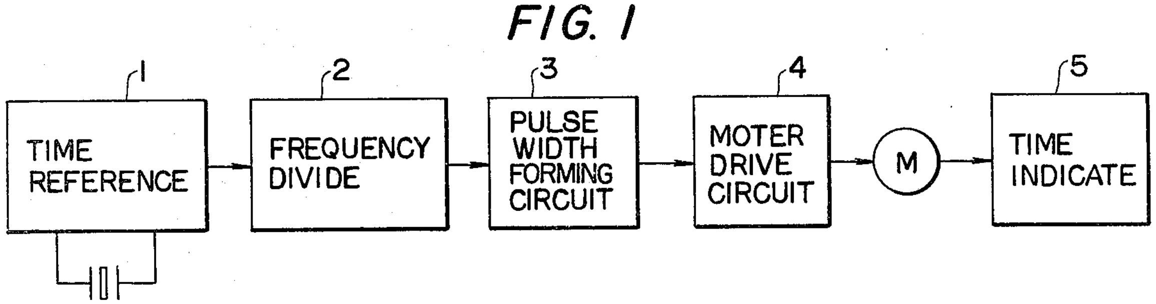
FIG. 1 is a block diagram showing one example of a conventional digital type electronic time piece.
Figure 2:
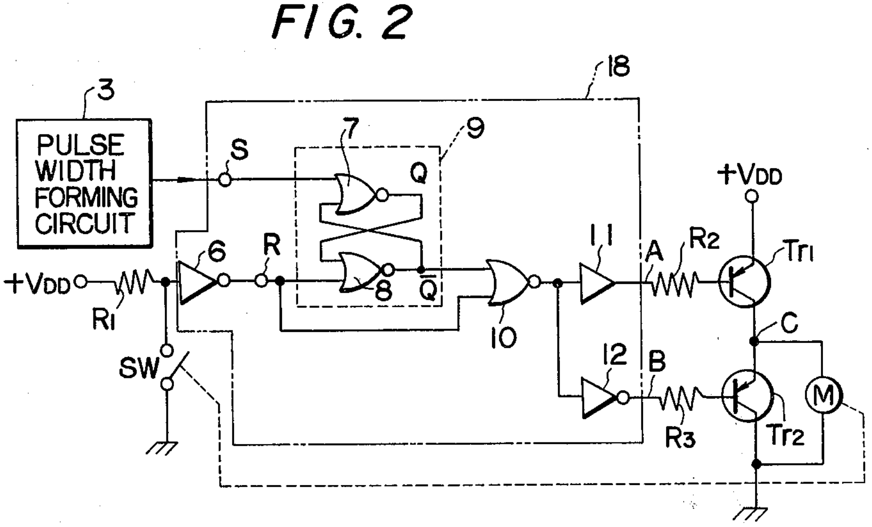
FIG. 2 is a schematic circuit diagram illustrating a first embodiment of the invention.

In a digital type electronic time piece as shown in FIG. 1, a motor drive circuit 4 is formed as shown in FIG. 2. More specifically, one input terminal S of a flip-flop 9 comprising NOR gates 7 and 8 is connected to the output terminal of a pulse width forming circuit 3, and the other input terminal R of the flip flop 9 is connected to the output terminal of an inverter 6, the input terminal of which is connected to an electric source $+V_{DD}$ through a resistor $R_1$ and to one contact of a switch SW, the other contact of which is grounded. The switch SW is operated (opened and closed) in association with a motor M. The output $\overline{Q}$ of the flip-flop 9 and the output of the inverter 6 are applied to a NOR gate 10 the output of which is connected to the input terminals of a buffer 11 and an inverter 12. The inverters 6, 12, the buffer 11, the NOR gate 10, and the flip-flop 9 form a motor drive hold circuit 18. The output of the buffer 11 is connected through a resistor $R_2$ to the base of a PNP type transistor $Tr_1$. The output of the inverter 12 is connected through a resistor $R_3$ to the base of a PNP type transistor $Tr_2$. The emitter of the transistor $Tr_1$ is connected to the electric source $+V_{DD}$, and the collector of the same is connected to the emitter of the transistor $Tr_2$ the collector of which is grounded. The motor M is connected between the emitter and collector of the transistor $Tr_2$.

Figure 3:
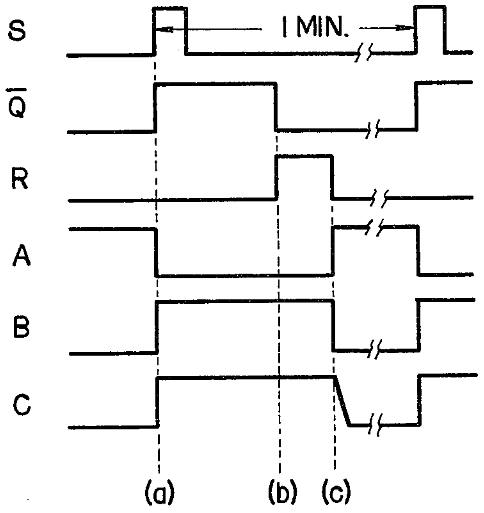
FIG. 3 is a waveform diagram for a description of the circuit shown in FIG. 2.

FIG. 3 is a waveform diagram, in which reference characters correspond to those indicated in FIG. 2. In the motor drive circuit thus organized, when a pulse is applied from the pulse width forming circuit 3 to the terminal S of the flip-flop 9 (at the time instant a in FIG. 3), the output $\overline{Q}$ of the flip-flop 9 is raised to a high (H) level. In this operation, as the switch SW has been opened, the input to the inverter 6 is at the "H" level, and the output of the inverter 6 is accordingly at a low (L) level. Accordingly, the output of the NOR gate 10 is switched to the "L" level, the output of the buffer 11 is also switched to the "L" level, and the output of the inverter 12 is raised to the "H" level. As a result, the transistor $Tr_1$ is rendered conductive (ON), while the transistor $Tr_2$ is rendered non-conductive (OFF). Current flows from the electric source $+V_{DD}$ through the transistor $Tr_1$ and the motor M to the ground, as a result of which the motor M is rotated, and a time indicating means 5 interlocked with the motor M is therefore rotated. When the motor M makes a certain number of revolutions, the switch SW is closed (at the time instant b in FIG. 3). As a result, the output of the inverter 6 is raised to the "H" level, that is, the terminal R of the flip-flop 9 has the "H" level. Therefore, the output $\overline{Q}$ of the flip-flop 9 is switched to the "L" level. In this case, as the two inputs of the NOR gate 10 are at the "H" and "L" levels, respectively, the output of the NOR gate 10 is still maintained at the "L" level. Accordingly, the motor M is still rotated. When the time indicating means 5 is rotated through a predetermined angle by the rotation of the motor M, the switch SW is opened again (at the time instant c in FIG. 3). As a result, the output of the inverter 6 is changed to the "L" level, while the output $\overline{Q}$ of the flip-flop 9 is maintained at the "L" level. That is, the two inputs of the NOR gate 10 have the "L" level and, therefore, the output of the NOR gate 10 is raised to the "H" level. Thus, the base of the transistor $Tr_1$ has the "H" level, while the base of the transistor $Tr_2$ has the "L" level. That is, the transistor $Tr_1$ is rendered non-conductive (OFF), while the transistor $Tr_2$ is rendered conductive (ON). Accordingly, the current from the electric source $+V_{DD}$ to the motor M is suspended, and a counter electromotive force developed across the motor is absorbed by the transistor $Tr_2$, so that the motor is quickly stopped. The time interval from the time instant b to the time instant c, that is, the time interval which elapses from the instant that the switch SW is turned on until the switch SW is turned off will be referred to as "one cycle of switching operation", hereinafter. The reason why the motor is stopped when one cycle of switching operation of the switch SW is ended is to prevent the two inputs of the flip-flop 9 from having the "H" level at the same time (if the two inputs have the "H" level at the same time, the output of the flip-flop 9 becomes unstable).

Figure 4:
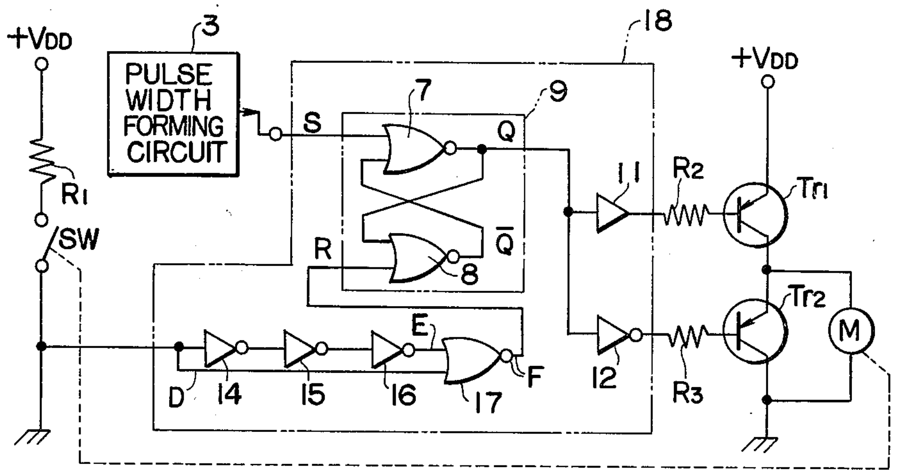
FIG. 4 is a schematic circuit diagram showing a second embodiment of the invention.
Figure 5:
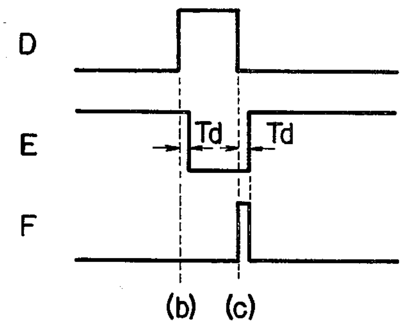
FIG. 5 is a waveform diagram for a description of the circuit shown in FIG. 4.

Another embodiment of this invention is shown in FIG. 4, which is different from FIG. 2 in the arrangement of a motor drive hold circuit 18. In this embodiment, the motor drive hold circuit 18 comprises additional logical circuits. More specifically, the input of an inverter 14 and one input of a NOR gate 17 are connected to the grounded contact of the switch SW. The output of the inverter 14 is connected to a series circuit of inverters 15 and 16, and the output of the inverter 16 is connected to the other input of the NOR gate 17. The output of the NOR gate 17 is connected to the terminal R of the flip-flop 9. The arrangement of the other elements is similar to that in FIG. 2. FIG. 5 is a waveform diagram in which reference characters correspond to those indicated in FIG. 4.

In operation, upon application of a pulse from the pulse width forming circuit 3, the output Q of the flip-flop 9 is switched to the "L" level, and the motor M starts rotation similarly as in the case of FIG. 2. As the motor is rotated, the switch is turned on (at the time instant b in FIG. 5) and then the switch Sw is turned off (at the time instant c in FIG. 5). However, in this operation, as the inverters 14, 15 and 16 are connected in series, the output waveform E of the inverter 16 lags the input waveform n of the inverter 14 by a period of time Td. Therefore, by application of these two waveforms to the NOR gate 17, a waveform F as shown in FIG. 5 is obtained. By the rise of this waveform F the outputs of the flip-flop 9 are inverted; that is, the output Q thereof is raised to the "H" level, and similarly as in the case of FIG. 2 the motor M is stopped.

Figure 6:
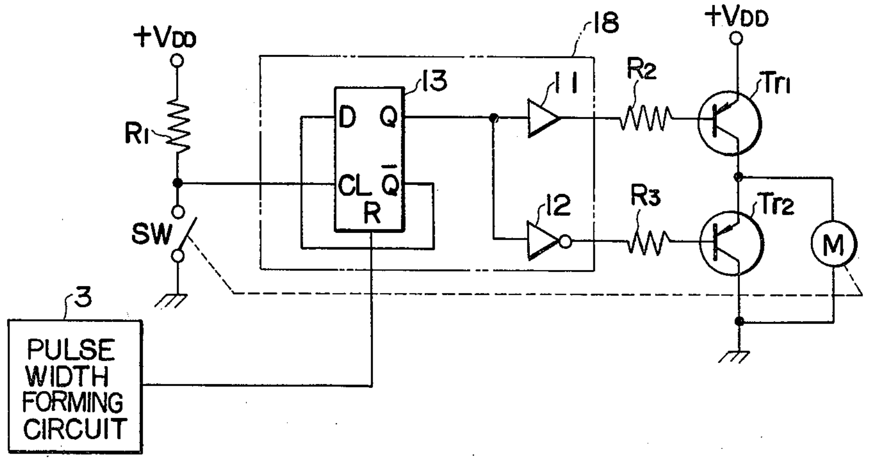
FIG. 6 is a schematic circuit diagram illustrating a third embodiment of the invention.

A further embodiment of this invention, shown in FIG. 6, is similar to FIG. 2 but is different in that it's motor drive hold circuit 18 is made up of a D-type flip-flop 13. More specifically, the output of the pulse width forming circuit 3 is applied to the reset terminal R of the D-type flip-flop 13. The terminal CL of the flip-flop 13 is connected to the $+V_{DD}$ contact of the switch SW. The output terminal $\overline{Q}$ of the flip-flop 13 is connected to the terminal D. The output is provided at the terminal Q of the flip-flop 13. The arrangement of the remaining elements is similar to that shown in FIG. 2.

In operation, upon application of a pulse from the pulse width forming circuit 13, the output Q of the flip-flop 13 is switched to the "L" level, and the motor M starts rotation similarly as in the case of FIG. 2. When the switch SW is turned on with the rotation of the motor M, the terminal CL of the flip-flop 13 has the "L" level; however, the output of the flip-flop is maintained unchanged. As the motor M is further rotated, the switch SW is turned off. As a result, the level of the terminal CL of the flip-flop 13 is switched to the "H" level, and the information (at the "H" level) applied to the terminal D of the flip-flop 13 is provided at the terminal Q thereof. Thus, the output of the flip-flop 13 is raised to the "H" level. Therefore, the motor M is stopped similarly as in the case of FIG. 2.

As is apparent from the above description, in the present invention, the motor drive hold circuit is made up of logical circuits such as flip-flops, and gate circuit. Therefore, with the motor drive circuit according to the invention, no erroneous operation due to temperature variation is caused and, therefore it is unnecessary to determine the circuit constants and the design can be readily achieved. As the thyristor's holding current is not required, the current consumption can be reduced. If the logical circuits are provided in the form of an integrated circuit, low cost and high reliability can be expected and, furthermore, the motor drive circuit can be miniaturized. In addition, if the logical circuits are constituted by C-MOS devices, the temperature characteristic and current consumption can be further improved.

What is claimed is:

1. In a motor drive circuit for a digital electronic time piece having a pulse source for providing a regular pulse signal, an electric motor, a switch means operated in conjunction with rotation of said electric motor for providing a switch signal and a motor drive hold circuit for receiving said regular pulse signal and said switch signal in order to provide a motor drive signal and motor stop signal to said motor, to thereby drive said motor a predetermined amount with each pulse in said regular pulse signal, the improvement comprising:

- a voltage source means, operated by said switch means, for supplying a control voltage to said motor drive hold circuit; and
- a motor drive hold circuit having a logic circuit means for receiving said regular pulse signal and said switch signal and providing a motor drive signal which commences with each pulse in said regular pulse signal and terminates with each switch signal, said logic circuit means requiring only a small amount of power from said voltage source means during the time period when the motor drive signal is being applied to said electric motor;

said logic circuit means comprising a flip-flop means for receiving said regular pulse signal as its set input signal and said switch signal as a reset signal, and wherein the $\overline{Q}$ output signal of said flip-flop means and said switch signal are provided as inputs to a NOR gate, the output of which provides said motor drive signal.

2. In a motor drive circuit for a digital electronic time piece having a pulse source for providing a regular pulse signal, an electric motor, a switch means operated in conjunction with rotation of said electric motor for providing a switch signal and a motor drive hold circuit for receiving said regular pulse signal and said switch signal in order to provide a motor drive signal and motor stop signal to said motor, to thereby drive said motor a predetermined amount with each pulse in said regular pulse signal, the improvement comprising:

a voltage source means, operated by said switch means, for supplying a control voltage to said motor drive hold circuit;

a motor drive hold circuit having a logic circuit means for receiving said regular pulse signal and said switch signal and providing a motor drive signal which commences with each pulse in said regular pulse signal and terminates with each switch signal, said logic circuit means requiring only a small amount of power from said voltage source means during the time period when the motor drive signal is being applied to said electric motor;

said logic circuit means comprising a flip-flop means for receiving said regular pulse signal as its set input signal and said switch signal as a reset signal;

a NOR gate for receiving as one input said switch signal; and delay and inversion means for providing an inverted and delayed switch signal to the other input of said NOR gate, the output of which is provided as a reset signal to said flip-flop means.

3. In a motor drive circuit for a digital electronic time piece having a pulse source for providing a regular pulse signal, an electric motor, a switch means operated in conjunction with rotation of said electric motor for providing a switch signal and a motor drive hold circuit for receiving said regular pulse signal and said switch signal in order to provide a motor drive signal and motor stop signal to said motor, to thereby drive said motor a predetermined amount with each pulse in said regular pulse signal, the improvement comprising:

a voltage source means, operated by said switch means, for supplying a control voltage to said motor drive hold circuit; and a motor drive hold circuit having a logic circuit means for receiving said regular pulse signal and said switch signal and providing a motor drive signal which commences with each pulse in said regular pulse signal and terminates with each switch signal, said logic circuit means requiring only a small amount of power from said voltage source means during the time period when the motor drive signal is being applied to said electric motor;

said logic circuit means comprising a D-type flip-flop means receiving said regular pulse signal as a reset signal, said switch signal as a clock signal and its $\overline{Q}$ output as a data input, the Q output of said flip-flop means providing said motor drive signal.

4. A motor drive circuit as defined in any of claims 1, 2 or 3, further comprising:

a motor drive transistor connected in series with said electric motor for providing an energizing current to said motor in response to said motor drive signal; and a motor stop transistor connected in parallel with said electric motor for absorbing the counter emf arising in said motor upon the occurrence of said motor stop signal.

* * * * *